(12) United States Patent
Brooks (10) Patent No.: US 7,708,352 B2
(45) Date of Patent: May 4, 2010

(54) FORCE ABSORBING AUTOMOBILE AXLE HAVING FLUID CHAMBERS

(76) Inventor: Mark Brooks, 6609 Butcher Branch Rd., Hillsboro, MO (US) 63050

( * ) Notice: Subject to any disclaimer, the term of this patent is extended or adjusted under 35 U.S.C. 154(b) by 0 days.

(21) Appl. No.: 12/401,709

(22) Filed: Mar. 11, 2009

(65) Prior Publication Data

US 2009/0302671 A1     Dec. 10, 2009

Related U.S. Application Data

(63) Continuation-in-part of application No. 12/133,218, filed on Jun. 4, 2008.

(51) Int. Cl.
*B60B 35/00* (2006.01)
(52) U.S. Cl. .................. 301/2; 301/124.1; 301/133; 280/124.127; 464/169
(58) Field of Classification Search ............. 301/1, 301/2, 124.1, 126, 128, 131, 132, 133, 134, 301/135, 136; 295/36.1, 37, 38, 39, 42.1; 280/124.127; 464/162, 169
See application file for complete search history.

(56) References Cited

U.S. PATENT DOCUMENTS

| | | | | |
|---|---|---|---|---|
| RE8,384 E | * | 8/1878 | Beers ........................... | 301/2 |
| 1,011,325 A | * | 12/1911 | Davis et al. .................. | 180/348 |
| 1,289,041 A | * | 12/1918 | Bell ............................ | 301/136 |
| 3,244,385 A | * | 4/1966 | Fehring et al. .......... | 244/103 R |
| 4,637,646 A | * | 1/1987 | Ortwein et al. ............... | 295/37 |
| 5,899,472 A | * | 5/1999 | Burke et al. .......... | 280/124.106 |
| 7,163,227 B1 | * | 1/2007 | Burns ......................... | 280/638 |

FOREIGN PATENT DOCUMENTS

GB      2035500 A   *   6/1980

* cited by examiner

*Primary Examiner*—Russell D Stormer
(74) *Attorney, Agent, or Firm*—Dale J. Ream (57) ABSTRACT

A vehicle axle includes an axle housing defining a cavity. The axle includes a pair of outer drive shafts, each being coaxially received in a respective housing cavity and slidable therein, each outer drive shaft defining a splined cavity. The axle includes a pair of inner drive shafts, each having a splined end coaxially coupled to a respective outer drive shaft splined cavity such that a respective outer drive shaft is slidably movable therein. A piston is attached to the inner end of each outer drive shaft and separates an inner fluid chamber from an outer fluid chamber. A fluid channel includes opposed ends in communication with respective fluid chambers. A force absorption container is in fluid communication with each fluid channel and includes a compression spring, wherein the spring is compressed when movement of the piston pushes fluid through the channel into the force absorption container.

8 Claims, 13 Drawing Sheets

FORCE ABSORBING AUTOMOBILE AXLE HAVING FLUID CHAMBERS

CROSS-REFERENCE TO RELATED APPLICATIONS

This application is a continuation-in-part application that claims the benefit of U.S. application Ser. No. 12/133,218 filed Jun. 4, 2008 and titled Automobile Axle.

BACKGROUND OF THE INVENTION

The present invention relates generally to automobile axles and, more particularly, to an automobile axle having a lateral shock absorber. Side impact forces and horizontal stresses related to cornering are decreased by the present invention.

When a force is applied to a car in a horizontal direction, such as a wind load, a side impact, or the centripetal force around a corner, the force will be felt first by the tires and they will bend slightly. This may lead to undesirable accelerated tire wear. If the force is great enough, the tires may begin to slip on the pavement, resulting in a loss of control.

Various devices have been proposed in the art for reducing side impact stresses upon a vehicle. Although assumably effective for their intended purposes, the existing devices do not adequately absorb horizontal stresses such that tire wear is reduced and the damage from side impact collisions is significantly reduced.

Therefore, it would be desirable to have a vehicle axle that absorbs horizontal stresses so as to make the vehicle ride better and be more responsive during evasive maneuvers, wear on vehicle tires is reduced, and the impact of a side collision is reduced. More particularly, it would be desirable to have a vehicle axle having a force absorbing member that biases the axle shaft outward and that absorbs horizontal forces encountered, say, when cornering or upon a side impact. Further, it would be desirable to have a vehicle axle having an axle shaft that slides within a main axle but resists axle recoil in the case of a side impact collision.

SUMMARY OF THE INVENTION

Therefore, a vehicle axle according to the present invention includes a main axle having an end defining a splined cavity. The vehicle axle further includes a splined shaft coaxial with the main axle, the splined shaft having a configuration that is complementary to a configuration of the splined cavity. The shaft and the main axle are coupled together by the shaft splines and the cavity splines, the shaft being movable relative to the main axle along the axis. The vehicle axle includes a force-absorbing member located inside the splined cavity and being in communication with the main axle and the splined shaft so as to absorb force when the splined shaft moves toward the main axle past an equilibrium point.

The force-absorbing member includes at least one of a spring, a pneumatic damper, a hydraulic damper, and a permanently-deformable solid. The force-absorbing member is positioned to bias the splined shaft outwardly and to absorb horizontal forces imparted upon the splined shaft, such as those from the wind, vehicle cornering, or side impact. The vehicle axle may also include a safety pin that is biased to prevent further movement of the splined shaft relative to the main axle if the shaft is moved past a predetermined point. In other words, the safety pin prevents automatic return of the shaft to its unbiased configuration after an accident.

A stress absorbing axle according to another embodiment of the invention includes an axle housing having a pair of ends each defining an axle housing opening in communication with an axle housing cavity, the axle housing having an internal sealing flange displaced from each axle housing opening. The axle includes a pair of outer drive shafts, each outer drive shaft being coaxially received in a respective axle housing cavity for relative slidable movement therein, each outer drive shaft having an outer end operatively coupled to a vehicle wheel and an inner end defining an opening in communication with a splined cavity. The axle includes a pair of inner drive shafts, each inner drive shaft having a splined end received through a respective outer drive shaft opening and coaxially coupled to a respective outer drive shaft splined cavity such that the respective outer drive shaft is slidably movable therein between compressed and extended configurations relative thereto. A piston is attached to the inner end of each outer drive shaft and configured so as to form an inner fluid chamber between the piston and the sealing flange and an outer fluid chamber between a respective piston and respective axle housing opening, the inner and outer fluid chambers configured to hold a fluid. A fluid channel includes a first end in fluid communication with a respective inner fluid chamber and a second end in fluid communication with a respective outer fluid chamber. A force absorption container is in fluid communication with each respective fluid channel, each force absorption container having a compression spring therein, wherein the spring is compressed when movement of the piston pushes fluid through the channel into the force absorption container.

Therefore, a general object of this invention is to provide a vehicle axle that absorbs horizontal forces exerted upon a vehicle.

Another object of this invention is to have a vehicle axle, as aforesaid, that includes a splined shaft that is biased outwardly relative to a main axle for absorbing horizontal forces.

Still another object of this invention is to have a vehicle axle, as aforesaid, that prevents recoil of the splined shaft in case of a side collision.

Yet another object of this invention is to have a vehicle axle, as aforesaid, that reduces premature tire wear when a vehicle rounds a corner.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is an isolated view on an enlarged scale of a portion of the vehicle axle taken from FIG. 2a;

FIG. 3b is a sectional view taken along line 3b-3b of FIG. 3a;

FIG. 3d is an isolated view on an enlarged scale of a portion of the axle taken from a portion of FIG. 3b, with a force-absorbing member in a compressed configuration;

FIG. 4b is a sectional view taken along line 4b-4b of FIG. 4a;

FIG. 10a is a perspective view on a reduced scale of the axle as in FIG. 9a;

FIG. 12a is another perspective view of the axle as in FIG. 9a;

DESCRIPTION OF THE PREFERRED EMBODIMENT

A vehicle axle will now be described in detail with reference to FIG. 1 through FIG. 8 of the accompanying drawings. More particularly, the vehicle axle 100 includes a main axle 110 and a shaft 120.

Figure 1:
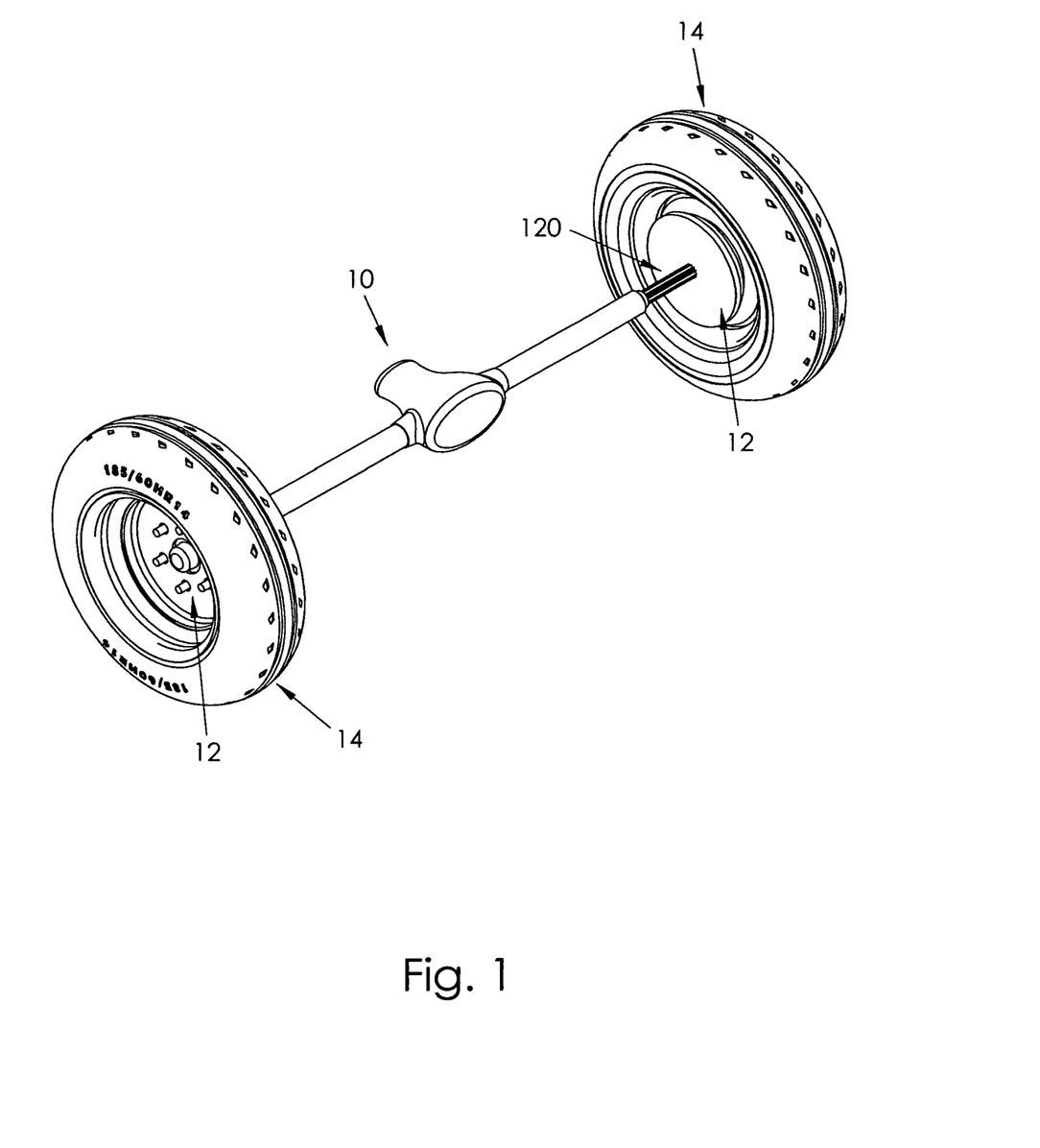
FIG. 1 is a perspective view of an automobile axle according to an embodiment of the present invention.
Figure 2A:
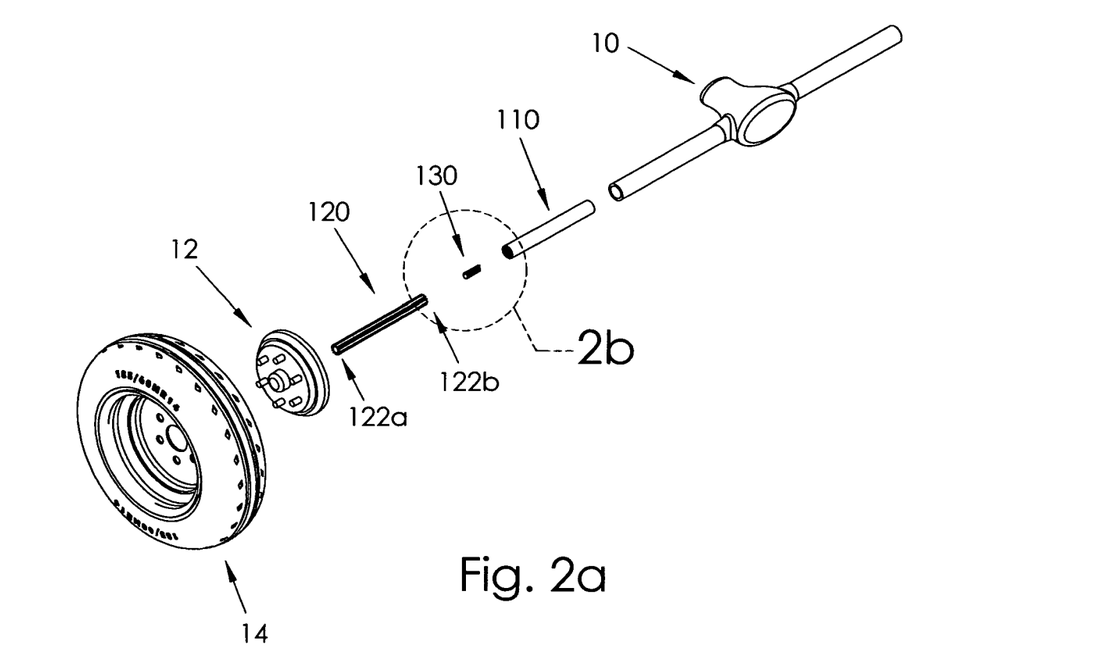
FIG. 2a is an exploded view of the axle as in FIG. 1.
Figure 2B:
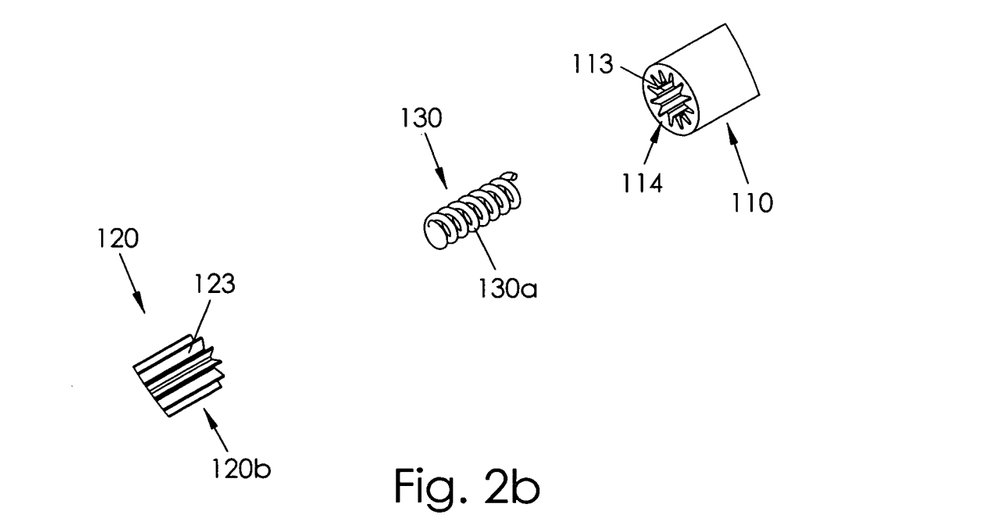

As shown in FIGS. 2a and 2b, the main axle 110 may be coupled to a vehicle's differential 10 or otherwise coupled to an automobile. The shaft 120 is elongate, has opposed ends 122a, 122b, and is coaxial with the main axle 110. Shaft end 122a is configured to be coupled to a vehicle hub 12, which is in turn coupled to a tire 14 as shown in FIG. 1. The shaft 120 is coupled to the main axle 110 and is movable relative to the main axle 110 along the shared axis. In other words, the shaft 120 can move along the shared axis so that the shaft end 122a moves toward and away from the main axle 110.

The shaft 120 may include a plurality of splines 123, and the main axle 110 may include a plurality of splines 113 that are complementary to the shaft splines 123. Interaction between the shaft splines 123 and the main axle splines 113 may couple the shaft 120 to the main axle 110 and cause the shaft 120 to rotate with the main axle 110 while allowing the shaft 120 to move along the shared axis. In one embodiment, as shown in FIG. 2b, shaft end 122b includes the splines 123 and the main axle 110 has an end 112 defining a cavity 114 with the splines 113.

Figure 5A:
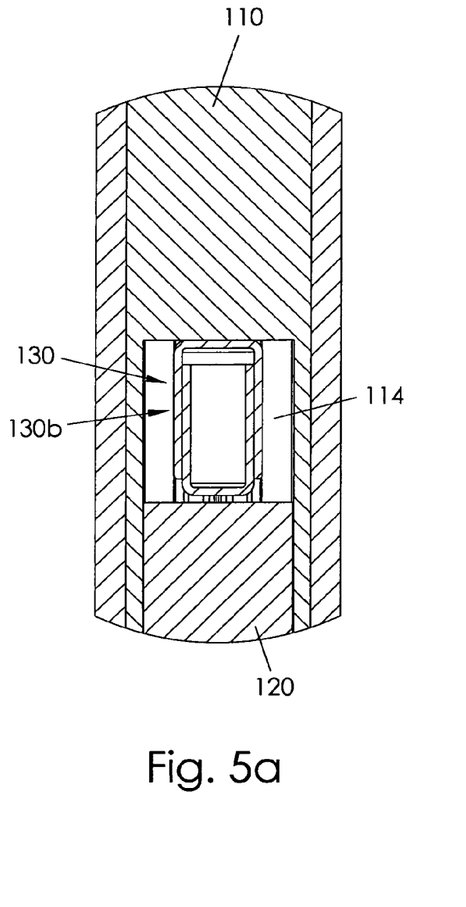
FIG. 5a is sectional view as in FIG. 3a with a hydraulic damper in a compressed configuration.
Figure 5B:
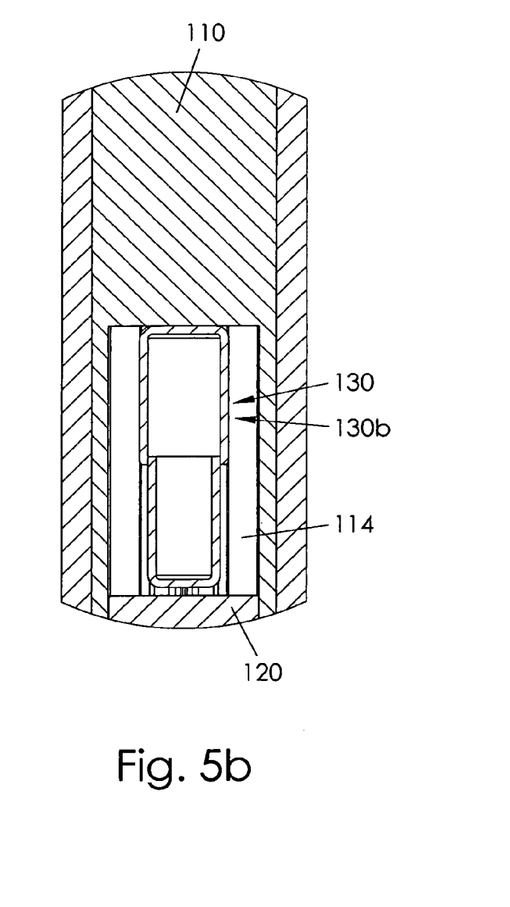
FIG. 5b is a sectional view as in FIG. 5a showing the hydraulic damper in an uncompressed configuration.
Figure 6A:
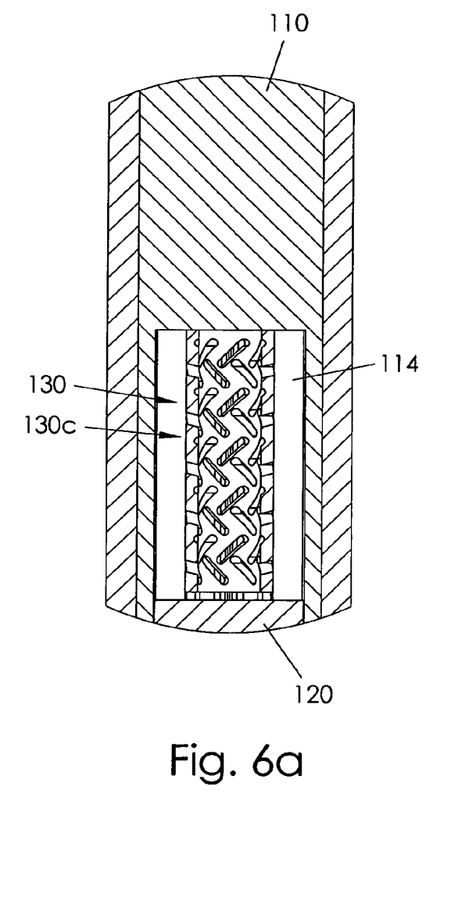
FIG. 6a is a sectional view as in FIG. 3a showing a permanently deformable solid in an uncompressed configuration.
Figure 6B:
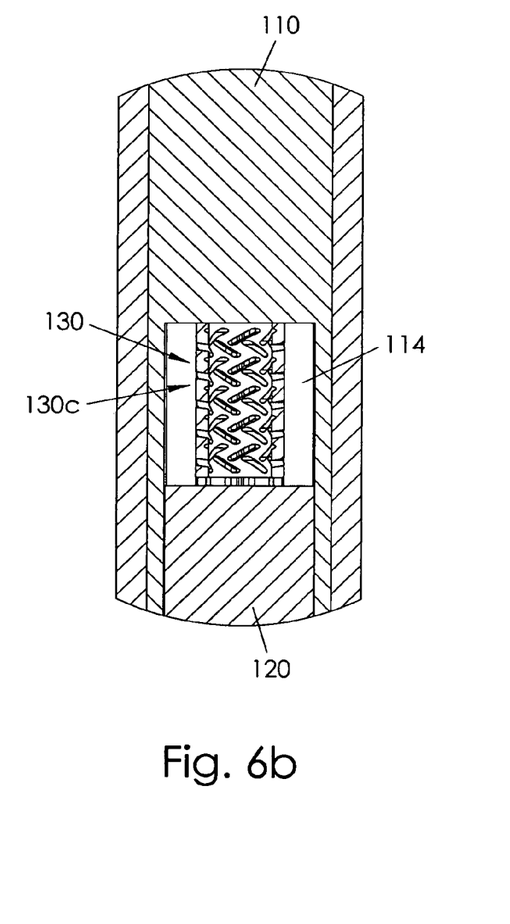
FIG. 6b is a sectional view as in FIG. 6a showing the permanently deformable solid in a compressed configuration.
Figure 7A:
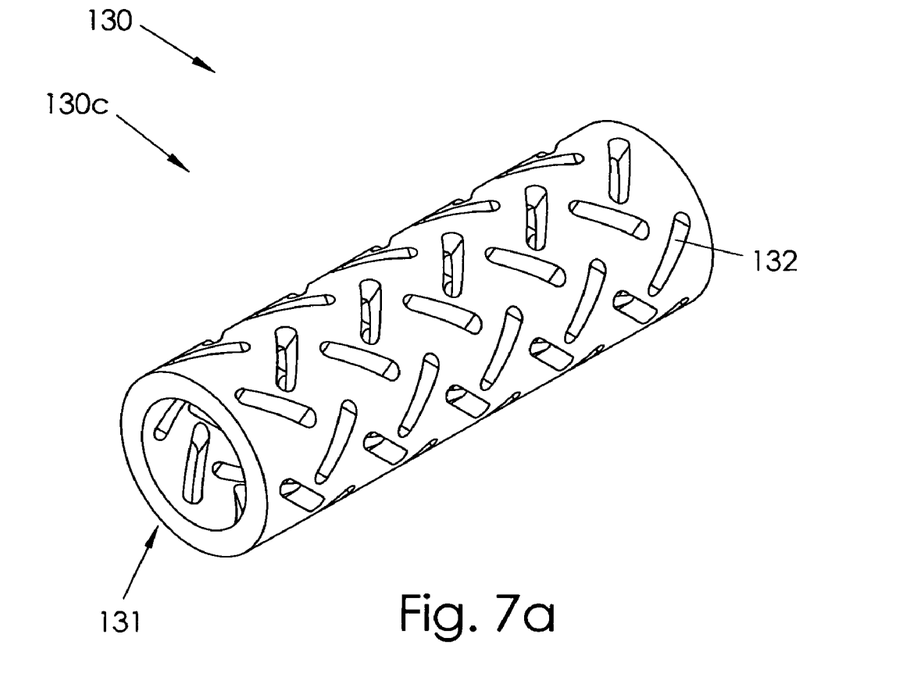
FIG. 7a is a perspective view on an enlarged scale of the permanently deformable solid in an uncompressed configuration.
Figure 7B:
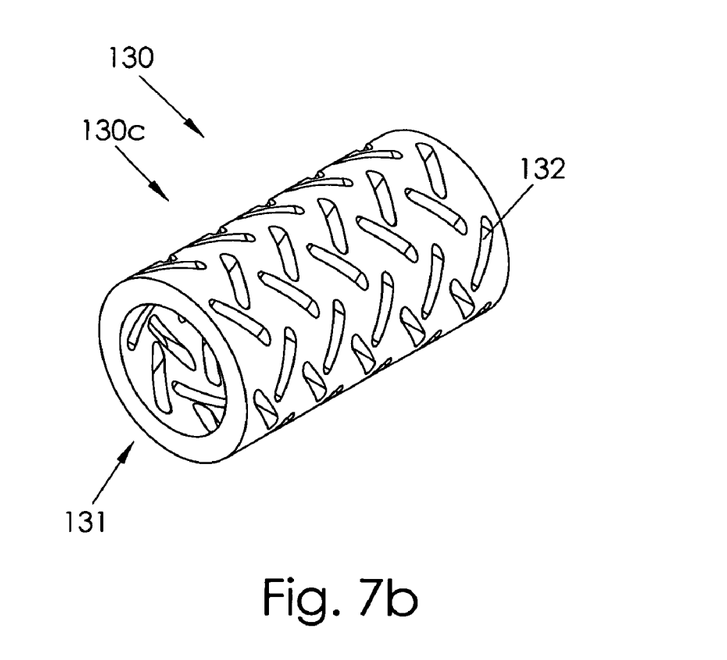
FIG. 7b is a perspective view on an enlarged scale of the permanently deformable solid in an compressed configuration.

A force-absorbing member 130 is in communication with the main axle 110 and the shaft 120 to absorb force when the shaft 120 moves toward the main axle 110 (i.e., when the shaft end 122a moves toward the main axle 110) past an equilibrium point. As shown in FIGS. 2b, 3c, 3d, and 5a through 6b, the force-absorbing member 130 may be located inside the splined cavity 114. The force-absorbing member 130 may include, for example, a spring 130a (FIGS. 3c and 3d), a pneumatic or hydraulic damper 130b (FIGS. 5a and 5b), and/or a permanently-deformable solid 130c (FIGS. 6a through 7b). As shown in FIGS. 7a and 7b, the permanently-deformable solid 130c may be a hollow cylinder 131 having a plurality of holes 132 that allow compression, or any other permanently-deformable solid that absorbs energy through compression may be used.

If the shaft end 122b is coupled to the force-absorbing member 130, the force-absorbing member 130 is coupled to the main axle 110, and a resilient force-absorbing member 130 is used (e.g., spring 130a, etc.), the force-absorbing member 130 may additionally bias the shaft 120 toward the equilibrium point when the shaft 120 has moved away from the main axle 110 past the equilibrium point (i.e., when the shaft end 122a has moved away from the main axle 110 past the equilibrium point).

The equilibrium point is the point where the force-absorbing member 130 does not pull the shaft 120 toward the main axle 110 or push the shaft 120 away from the main axle 110, but where further movement of the shaft 120 toward the main axle 110 causes a change in the force-absorbing member 130. For example, if the force absorbing member 130 is a spring 130a, the equilibrium point is the point where the spring 130a neither pushes nor pulls the shaft 120 relative to the main axle 110, but where movement of the shaft 120 toward the main axle 110 causes the spring 130a to compress.

Figure 4A:
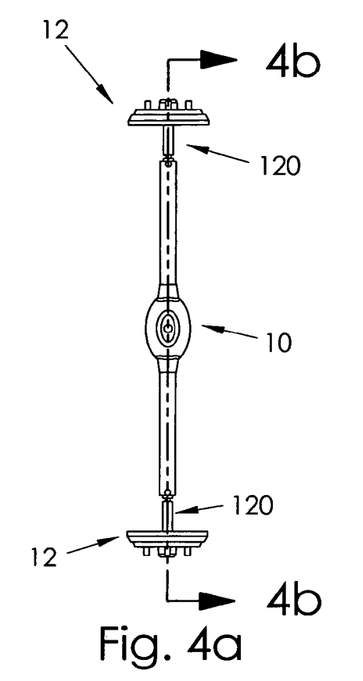
FIG. 4a is a top view of a vehicle axle as in FIG. 1.
Figure 4B:
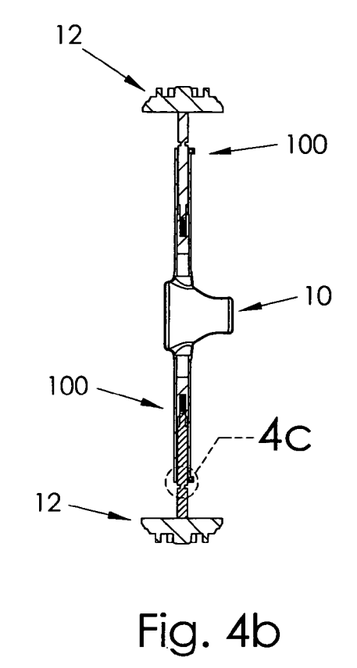
Figure 4C:
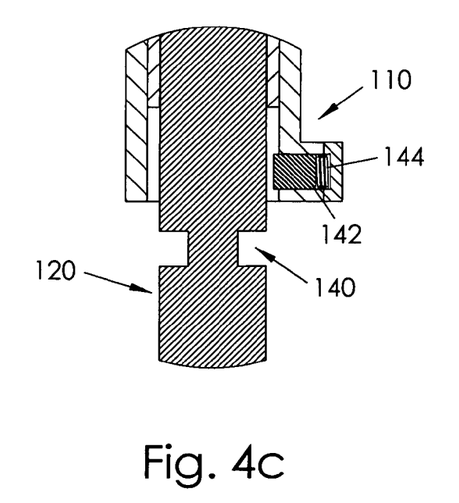
FIG. 4c is an isolated view on an enlarged scale taken from a portion of FIG. 4a, showing a safety pin in a biased configuration.
Figure 4D:
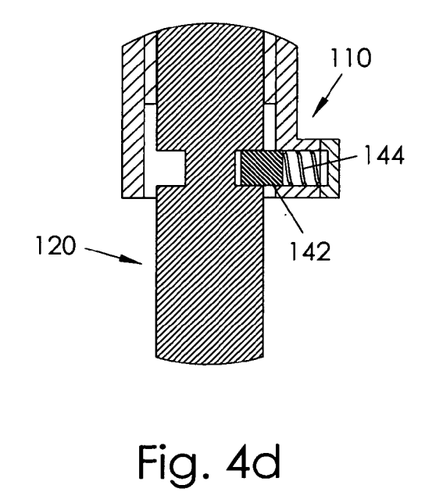
FIG. 4d is an isolated view on an enlarged scale taken from a portion of FIG. 4a, showing a safety pin in an unbiased configuration.

As shown in FIGS. 4c and 4d, either the shaft 120 or the main axle 110 may define a notch 140, and the other (i.e., the shaft 120 or the main axle 110) may include a safety pin 142 that has a configuration complementary to a configuration of the notch 140. The safety pin 142 is biased toward the notch 140, such as by spring 144, and the notch 140 and safety pin 142 are located to interact when the shaft 120 moves toward the main axle 110 a predetermined distance past the equilibrium point. As shown in FIG. 4d, interaction between the safety pin 142 and the notch 140 restricts further movement of the shaft 120 relative to the main axle 110 along the shared axis.

Figure 8:
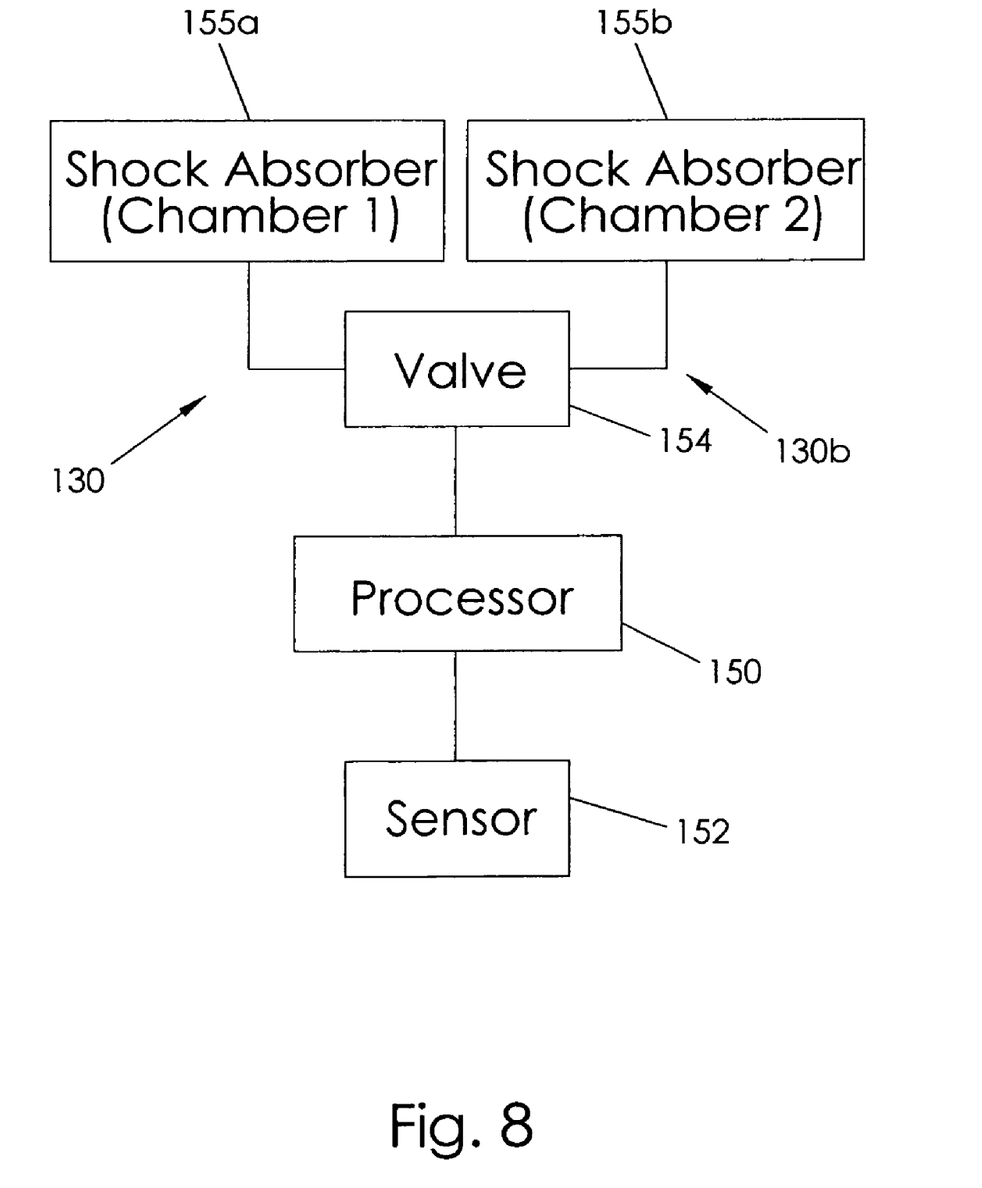
FIG. 8 is a block diagram of an adjustable force absorbing member.

In one embodiment, as shown in FIG. 8, an adjustable force-absorbing member 130 (e.g. an adjustable pneumatic or adjustable hydraulic damper 130b) is used, and a processor 150 is in data communication with the adjustable force-absorbing member 130. An input device 152 (e.g., a sensor or a user-activated input device) is in data communication with the processor 150, and the processor 150 includes programming for adjusting the adjustable force-absorbing member 130 upon receiving data from the input device 152. For example, for an adjustable pneumatic or adjustable hydraulic damper 130b, the processor 150 may include programming for adjusting one or more valve 154 between chambers 155a, 155b, as shown in FIG. 8.

In use, the main axle 110 may be coupled to a vehicle in a traditional manner (e.g., through differential 10 in FIG. 1, etc.), a hub 12 may be coupled to the shaft end 122a, and a tire 14 may be coupled to the hub 12, as shown in FIG. 1. As discussed above, splines 113, 123 may couple the main axle 110 and the shaft 120 and allow the shaft 120 to move along the shared axis relative to the main axle 110. If a resilient force-absorbing member 130 (e.g., spring 130a, etc.) is used, the shaft 120 may be allowed to move along the shared axis during normal use, and the force-absorbing member 130 may return the shaft 120 to the equilibrium point. Movement of the shaft 120 relative to the main axle 110 during use may be desirable, as it may reduce stress on the tires 14 in windy environments and when cornering, in particular.

In case of a side impact (e.g., during an accident), the shaft 120 may move toward the main axle 110, and the force-absorbing member 130 may absorb force from the shaft 120, causing less force to be transferred to the main axle 110. If a resilient force-absorbing member 130 (e.g., spring 130a, etc.) is used, it may be important that safety pin 142 interact with notch 140 to restrict further movement of the shaft 120 relative to the main axle 110, as movement of the shaft 120 back to the equilibrium point (and particularly the forces associated with that movement) could be dangerous.

Figures 3A, 3C:
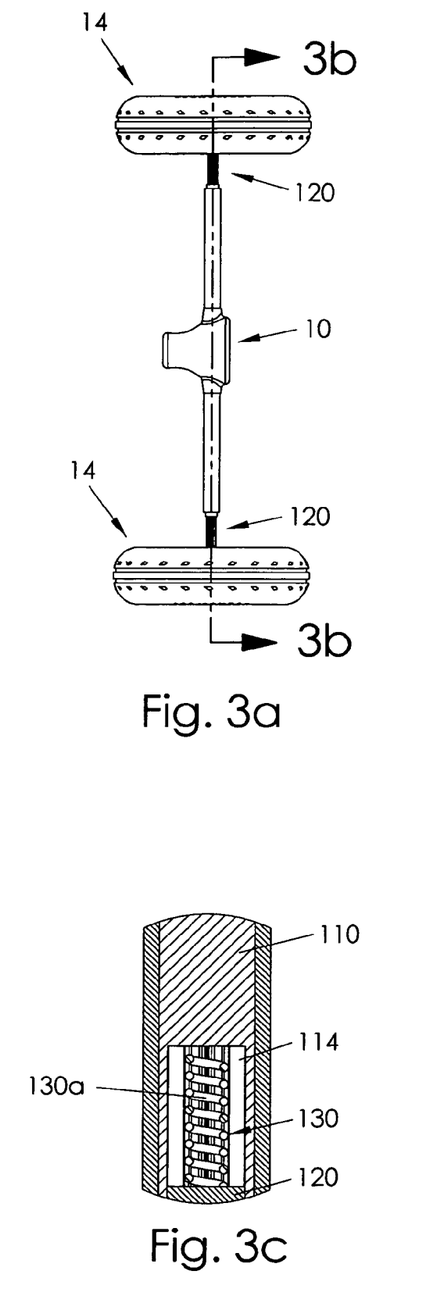
FIG. 3a is a top view of the axle as in FIG. 1.
FIG. 3c is an isolated view on an enlarged scale of a portion of the axle taken from a portion of FIG. 3b, with a force-absorbing member in an uncompressed configuration.
Figures 3B, 3D:
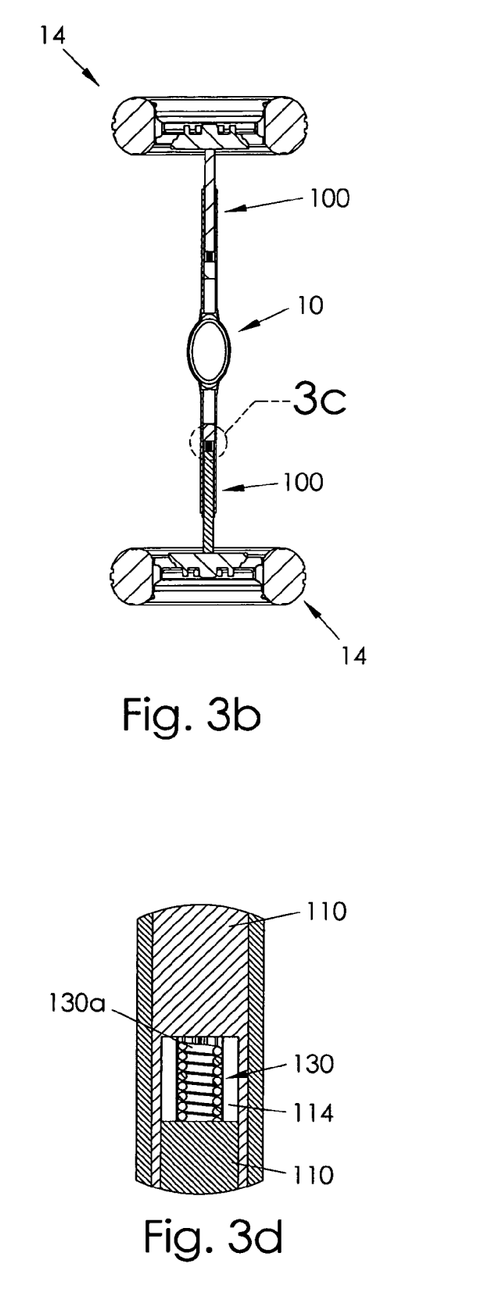

FIG. 3a shows the spring 130a in normal use (i.e., maintaining the shaft 120 at the equilibrium point), and FIG. 3b shows the spring 130a compressed after the shaft 120 has moved toward the main axle 110. Similarly, FIG. 5b shows the damper 130b in normal use, and FIG. 5a shows the damper 130b after the shaft 120 has moved toward the main axle 110. FIG. 6a shows the permanently-deformable solid 130c in normal use, and FIG. 6b shows the permanently-deformable solid 130c after the shaft 120 has moved toward the main axle 110. The compression of the permanently-deformable solid 130c is permanent, as shown in FIG. 7b, and the permanently-deformable solid 130c may need to be replaced after compression.

If an adjustable force-absorbing member 130 is used, as discussed above, a sensor 152 (e.g., a pressure sensor) and/or a user input 152 may determine how quickly the force-absorbing member 130 may compress, and the processor 150 may adjust the force-absorbing member 130 accordingly. In this manner, the "handling" of the suspension (and specifically the vehicle axle 100) may be further customized.

The invention as described above may be referred to as a "one-way stress absorbing axle" in that it provides for stress absorption when the stress is applied toward the center of the axle. Also contemplated by the present invention, however, is what may be referred to as a "two-way stress absorbing axle" in that it provides additional or improved functionality for absorbing stress that may be applied toward the center of the axle as well as stress applied away from the center of the axle. In the two-way stress absorbing axle, not only is there compression of a respective shaft 120 into the main axle 110 upon sensing a stress in the direction of the center of the main axle as with the embodiment 100 described above, the two-way stress absorbing axle allows extension of an opposed shaft relative to an opposed end of the main axle. In this way, the overall length of the vehicle's wheelbase is not shortened by the absorption of a stress and compression of the respective shaft and main axle (as in FIGS. 3c and 3d). It is believed that maintaining a full wheel base, even when experiencing stress such as gravity forces during tight turns, improves driving safety and handling.

An embodiment of a two-way stress absorbing axle 200 (also referred to herein as a vehicle axle) according to the present invention will now be described in detail with reference to FIGS. 9a to 12b of the accompanying drawings. More particularly, the stress absorbing axle 200 includes an axle housing 210 having a pair of ends 212a, 212b each defining an axle housing opening 214 in communication with an axle housing cavity 216. An internal sealing flange 218 is positioned in each respective cavity 216 substantially displaced from each axle housing opening 214 (FIG. 10c), as will be further described later.

Figure 10A:
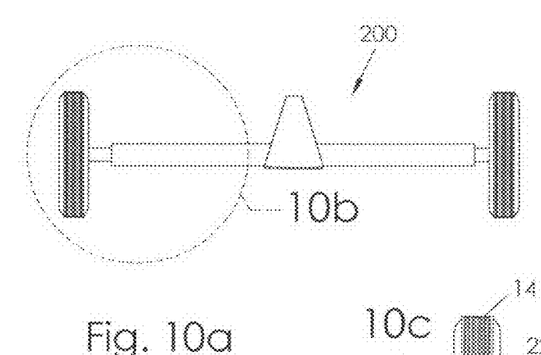
Figure 10B:
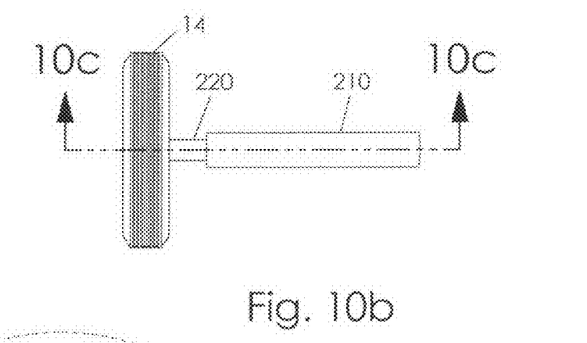
FIG. 10b is an isolated view on an enlarged scale taken from FIG. 10.
Figure 10C:
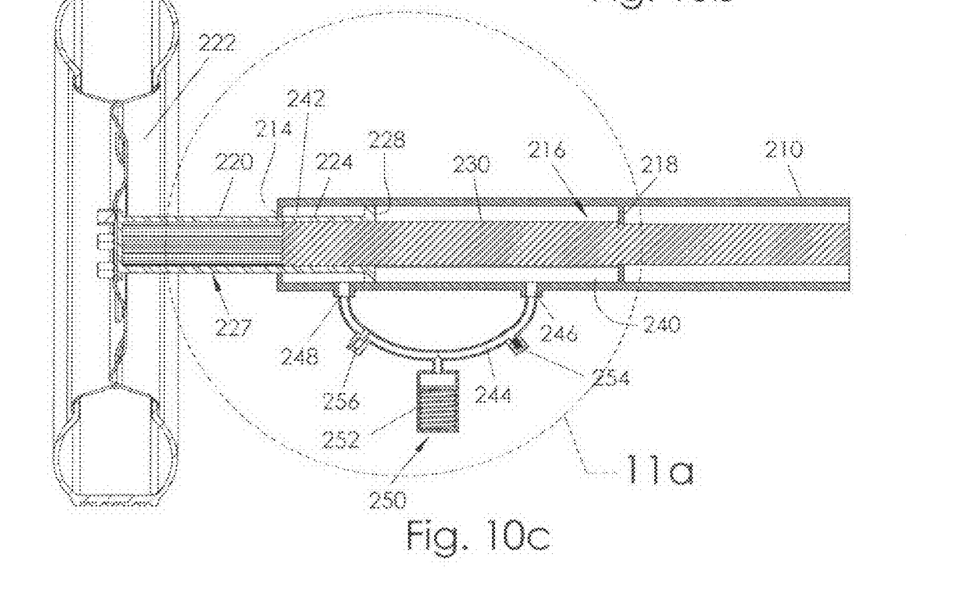
FIG. 10c is a sectional view taken along line 10c-10c of FIG. 10b.

The vehicle axle 200 further includes a pair of outer drive shafts 220, each being coaxially received in a respective axle housing cavity 216 for relative slidable movement therein. Each outer drive shaft 220 includes an outer end 222 operatively coupled to a vehicle hub 12 and an inner end 224 defining an opening 226 in communication with a respective splined cavity 227 (FIG. 12b and 10c).

Figure 12A:
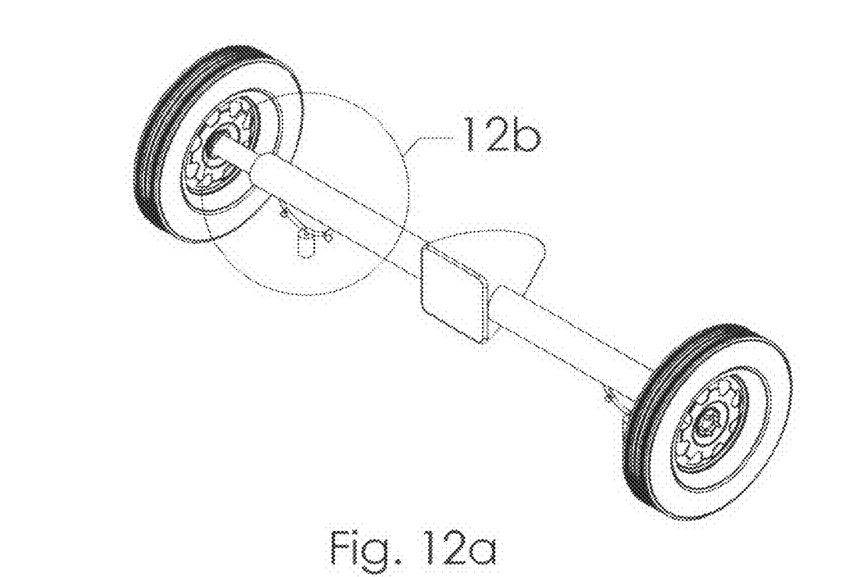
Figure 12B:
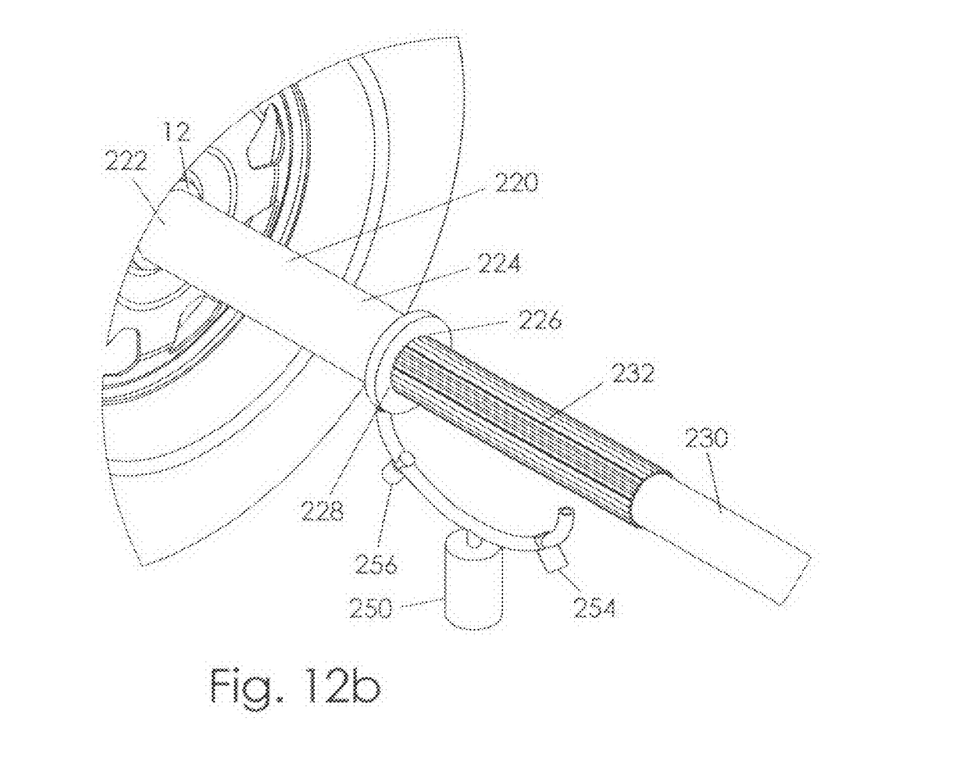
FIG. 12b is an isolated view on an enlarged scale taken from FIG. 12a with the axle housing removed for clarity.

Further, the vehicle axle 200 includes a pair of inner drive shafts 230, each inner drive shaft 230 having a splined end 232 configured to be received through a respective outer drive shaft opening 226 and coaxially coupled to a respective outer drive shaft splined cavity (FIG. 12b). Each respective outer drive shaft is slidably movable relative to a respective inner drive shaft 230, for example, in response to a side impact or just lateral gravity forces. A piston 228 is fixedly attached to the inner end 224 of each outer drive shaft 220 and extends outwardly substantially between an exterior surface of the outer drive shaft 220 adjacent its outer opening 226 to an inner wall of the axle housing 210 (FIG. 10c). It is understood that each inner drive shaft 230 is fixed from lateral movement relative to the axle housing 210 itself although it is rotatable therewith.

Figure 11A:
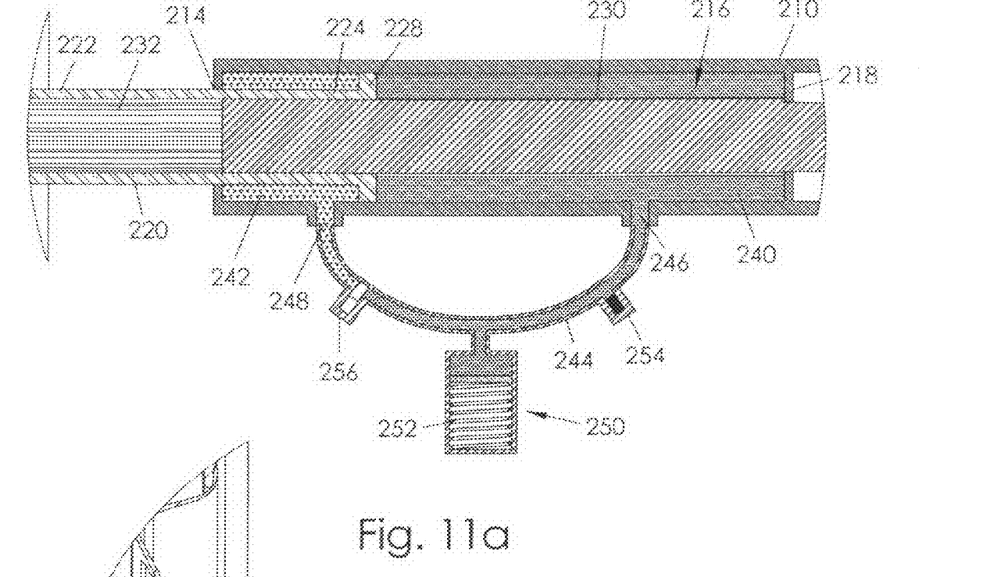
FIG. 11a is an isolated view on an enlarged scale taken from FIG. 10c with an outer drive shaft in an extended configuration.
Figure 11B:
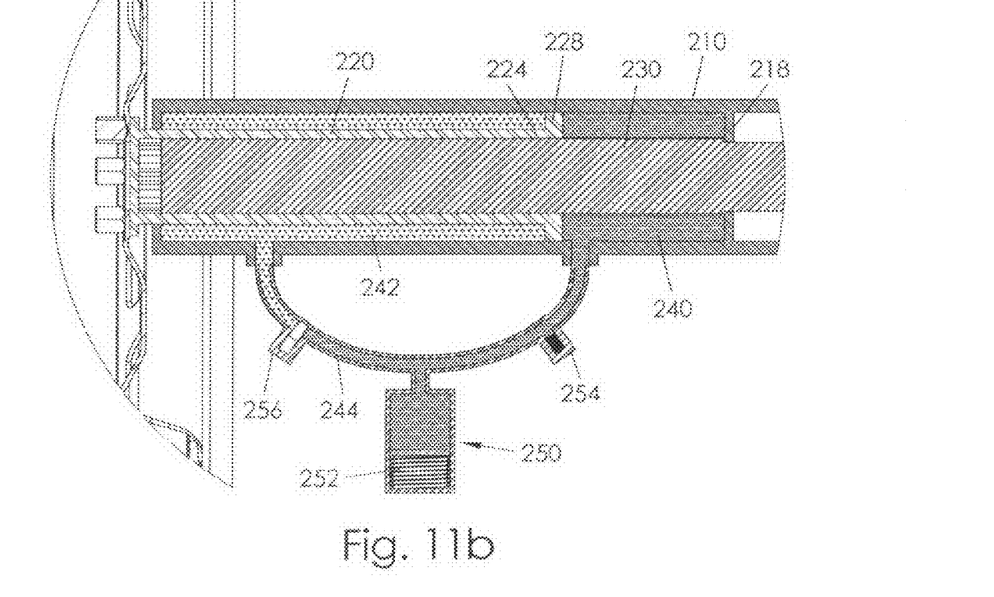
FIG. 11b is another isolated view as in FIG. 11a with the outer drive shaft in a compressed configuration.

It is understood that the opening of the axle housing is sealed relative to the outer drive shaft 220 that extends therethrough, the piston 228 forms a seal between the outer drive shaft inner end 224 and the inner wall of the axle housing 210, and the sealing flange 218 seals off respective portions of the axle housing 210. Accordingly, an inner fluid chamber 240 is defined between a respective piston 228 and respective sealing flange 218 (FIGS. 11a, 11b). An outer fluid chamber 242 is defined between a respective piston 228 and respective axle housing opening 214. Each fluid chamber is configured to hold a quantity of fluid, such as hydraulic fluid.

The vehicle axle 200 further includes a fluid channel 244 associated with each pair of inner 224 and outer 222 drive shafts (FIGS. 10c to 11b). More particularly, each fluid channel 244 includes a first end 246 in fluid communication with a respective inner fluid chamber 240 and a second end 248 in fluid communication with a respective outer fluid chamber 242. A force absorption container 250 is in fluid communication with each respective fluid channel 244. Each container 250 includes a compression spring 252 that is configured to be compressed when movement of a respective piston 228 pushes fluid through the channel and into the force absorption container 250 and thus increases the fluid pressure therein (FIGS. 11A and 11B), as will be described in more detail later. A first valve 254 is coupled to each fluid channel 244 and preferably positioned between the force absorption container 250 and the channel first end 246. Similarly, a second valve 256 is coupled to each fluid channel 244 and preferably positioned between a respective force absorption container 250 and the channel second end 248. Each valve is selectively movable between open and closed configurations for allowing or blocking fluid from passing thereby, respectively. It is understood that each valve may be partially opened or closed. The valves may be controlled by the vehicle's engine computer or some other electrical means. The fluid chambers, fluid channel, and force absorption chamber enable the drive shafts to rotate in a substantially traditional fashion and for forces to be absorbed or dampened without use of mechanical linkages that would be complicated by the rotation of the drive shafts.

Figure 9A:
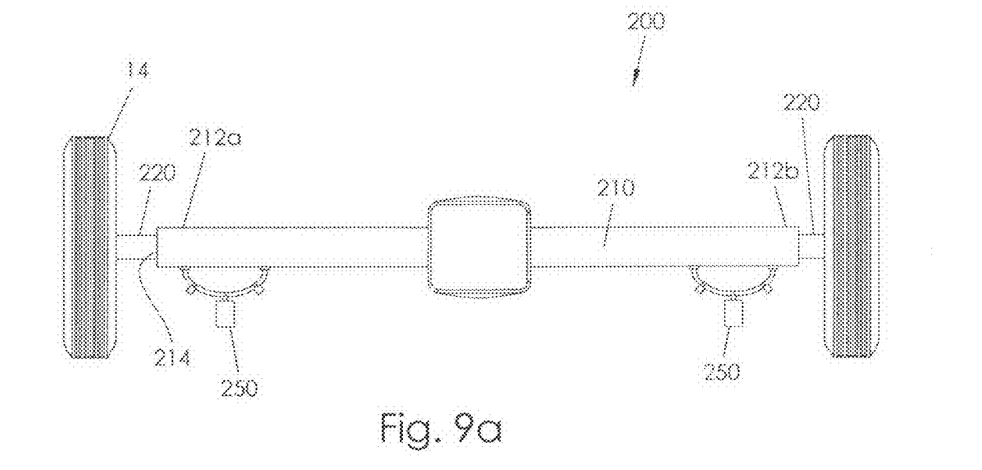
FIG. 9a is a perspective view of a vehicle axle according to another embodiment of the present invention, the axle being illustrated in a normal configuration.

In use, the embodiment of the vehicle axle 200 described immediately above provides an improved dampening of lateral forces experienced by a vehicle by allowing respective outer drive shafts 220 to actually slide laterally with respect to the fixed inner drive shafts 230 while dampening the magnitude of an imparted force. More particularly, the outer drive shafts 220 may be in a fully or partially extended configuration in a normal configuration, i.e. when no lateral forces are imparted (FIG. 9a). However, when a lateral force is exerted upon the vehicle axle 200, one end may be compressed by slidable operation of the drive shafts and movement of fluid relative to the inner fluid chamber 240, outer fluid chamber 242, fluid channel 244 and force absorption container 250. When an outer drive shaft 220 is urged to move inwardly into a respective inner drive shaft 230, the piston 228 will push hydraulic fluid residing in the inner fluid chamber into the fluid channel 244 through the first end 246 thereof and into the respective force absorbing container 250. The effect of this movement and push of fluid is to increase the fluid pressure (in that it is compressed into a smaller volume of space), depress the spring and thus absorb a portion of the lateral force. This movement assumes that the first valve 254 was open, at least partially. It is understood that if the first valve 254 was partially closed, fluid passage thereby would be slower and under higher pressure, resulting in less dampening effect. It should be understood that when the lateral force is removed, the spring 252 rebounds and a reverse flow of fluid and a reverse of the outer drive shaft's movement may occur. In this way, various degrees of the valve's being fully or partially opened or closed may result in varied levels of dampening of forces.

Figure 9B:
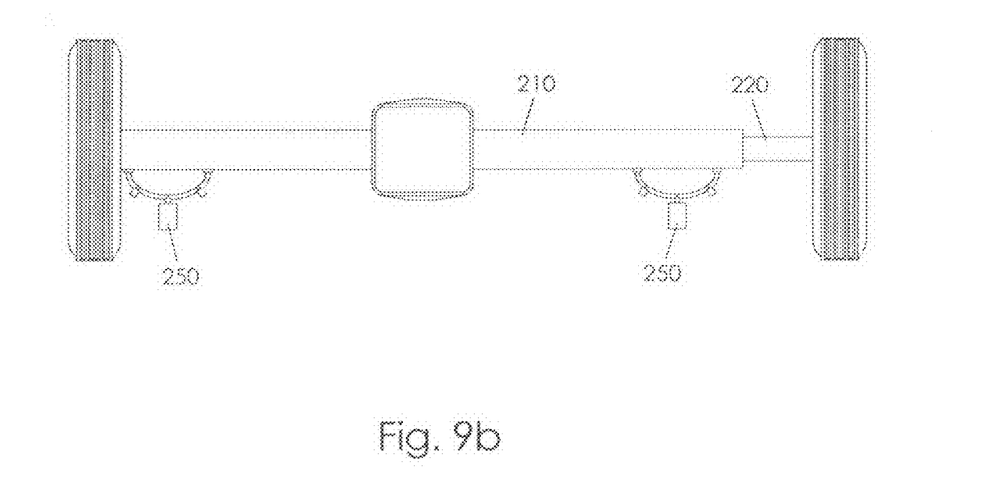
FIG. 9b is another perspective view as in FIG. 9a with the axle subject to a lateral force.

Explained another way (but with the same structure and dynamics as described above), a lateral force causes the axle housing 210 and inner drive shafts 230 toward or away from a respective wheel. For example, FIG. 9a represents the vehicle axle 200 in a normal configuration with no lateral forces being experienced. FIG. 9b, by contrast, illustrates how the axle housing 210 and inner drive shafts (fixed laterally relative to one another) has shifted closer to the left wheel and away from the right wheel. The length of the wheel base itself, however, is unchanged.

Figure 13:
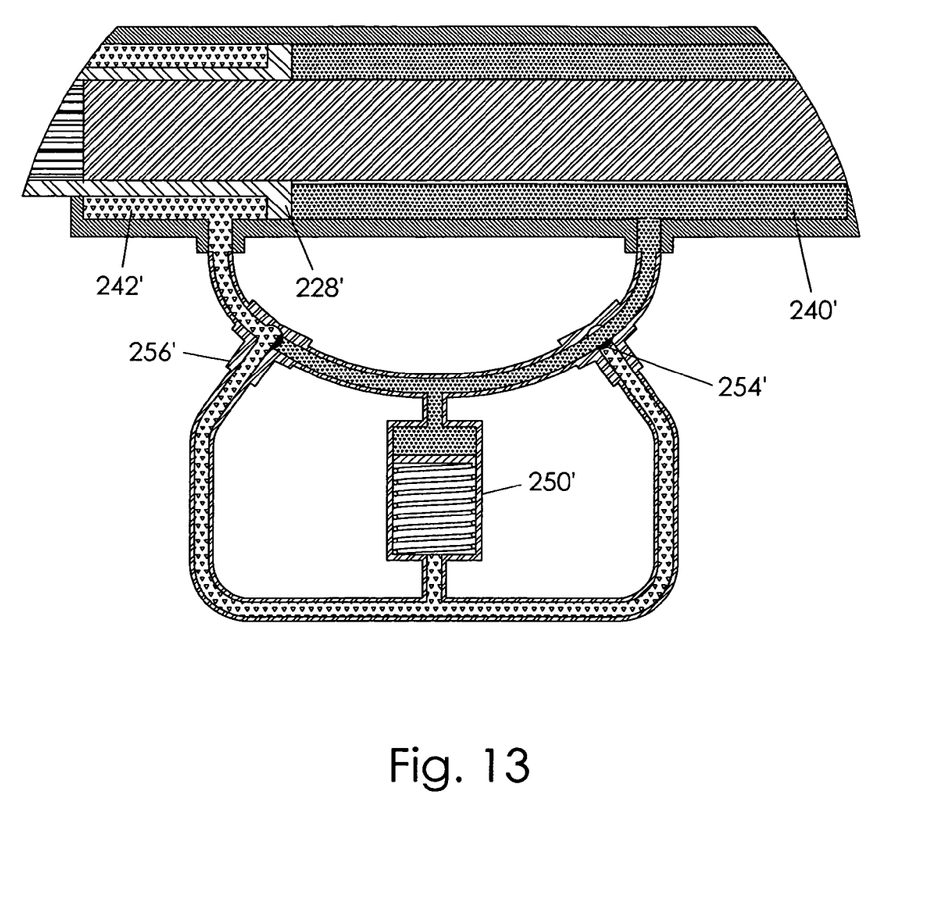
FIG. 13 is a sectional view as in FIG. 11a according to an alternative embodiment of the present invention.

Alternatively, the combination of first 254 and second 256 valves may be replaced by respective three-way ball valves 254' and 256' (FIG. 13). In conjunction with this variation, there may be added an auxiliary channel 244' extending between the respective three-way ball valves and being in fluid communication with the force absorption chamber 250'. The fluid communication of the auxiliary channel 244' with the chamber 250' would enable a transfer of a portion of fluid from the force absorption chamber 250' back into the outer fluid chamber 242', thereby preventing a vacuum lock situation as fluid is pushed from the inner fluid chamber 240' into the fluid channel 244' by the piston 228' in the manner described previously. It is recognized this vacuum lock situation may be avoided or minimized in the arrangement described previously by partially opening or closing first and second valves to enable a partial amount of fluid to return to the outer fluid chamber 242' as it is emptied from the inner fluid chamber 240'.

It is understood that while certain forms of this invention have been illustrated and described, it is not limited thereto except insofar as such limitations are included in the following claims and allowable functional equivalents thereof.

I claim:

1. A vehicle axle, comprising:
   an axle housing having a pair of ends each defining an axle housing opening in communication with an axle housing cavity, said axle housing having an internal sealing flange displaced from each axle housing opening;
   a pair of outer drive shafts, each outer drive shaft being coaxially received in a respective axle housing cavity for relative slidable movement therein, each outer drive shaft having an outer end operatively coupled to a vehicle wheel and an inner end defining an opening in communication with a splined cavity;
   a pair of inner drive shafts, each inner drive shaft having a splined end received through a respective outer drive shaft opening and coaxially coupled to a respective outer drive shaft splined cavity such that said respective outer drive shaft is slidably movable therein between compressed and extended configurations relative thereto;
   a piston attached to said inner end of each outer drive shaft and configured so as to form an inner fluid chamber between said piston and said sealing flange and an outer fluid chamber between a respective piston and respective axle housing opening, said inner and outer fluid chambers configured to hold a fluid;
   a fluid channel having a first end in fluid communication with a respective inner fluid chamber and a second end in fluid communication with a respective outer fluid chamber;
   a force absorption container in fluid communication with each respective fluid channel, each force absorption container having a compression spring therein, wherein said spring is compressed when movement of said piston pushes fluid through said channel into said force absorption container.

2. The vehicle axle as in claim 1, further comprising a first valve situated in said channel and operable between an open configuration allowing fluid to flow in said channel and a closed configuration blocking fluid from flowing through said channel.

3. The vehicle axle as in claim 2 further comprising a second valve situated in said channel and operable between an open configuration allowing fluid to flow in said channel and a closed configuration blocking fluid from flowing through said channel;
   wherein:
      said first valve is positioned between said force absorbing chamber and said channel first end; and
      said second valve is positioned between said force absorbing chamber and said channel second end.

4. The vehicle axle as in claim 1, wherein:
   a pressure of fluid in a respective inner fluid chamber is increased when a respective outer drive shaft is moved inwardly relative to a respective inner drive shaft;
   a pressure of fluid in a respective outer fluid chamber is increased when a respective outer drive shaft is moved outwardly relative to a respective inner drive shaft.

5. The vehicle axle as in claim 3, wherein:
   said channel includes a first channel segment extending between said force absorbing chamber and said channel first end in communication with said inner fluid chamber;
   said channel includes a second channel segment extending between said force absorbing chamber and said channel second end in communication with said outer fluid chamber;
   a pressure of fluid in said first channel segment is increased when said outer drive shaft is moved inwardly relative to said inner drive shaft.

6. The vehicle axle as in claim 1, wherein inner drive shaft is fixed relative to said axle casing.

7. The vehicle axle as in claim 1, wherein a pressure in said force absorbing chamber is increased when said outer drive shaft is moved inwardly relative to said inner drive shaft.

8. The vehicle axle as in claim 3, wherein said first and second valves may be positioned between said open and closed configurations to partially allow fluid to flow in said channel.

\* \* \* \* \*